United States Patent
Shimotsu (10) Patent No.: US 10,088,654 B2
(45) Date of Patent: Oct. 2, 2018

(54) LENS DEVICE AND CORRECTION METHOD FOR LENS DEVICE

(71) Applicant: FUJIFILM Corporation, Tokyo (JP)

(72) Inventor: Shinichi Shimotsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 222 days.

(21) Appl. No.: 15/228,403

(22) Filed: Aug. 4, 2016

(65) Prior Publication Data

US 2016/0341941 A1    Nov. 24, 2016

Related U.S. Application Data

(63) Continuation of application No. PCT/JP2015/055108, filed on Feb. 24, 2015.

(30) Foreign Application Priority Data

Mar. 28, 2014 (JP) .................................. 2014-067470

(51) Int. Cl.
*G02B 15/20* (2006.01)
*G02B 7/16* (2006.01)
(Continued)

(52) U.S. Cl.
CPC ............ *G02B 15/20* (2013.01); *G02B 7/005* (2013.01); *G02B 7/09* (2013.01); *G02B 7/10* (2013.01);
(Continued)

(58) Field of Classification Search
None
See application file for complete search history.

(56) References Cited

U.S. PATENT DOCUMENTS 4,733,945 A * 3/1988 Bacich ................ G03F 7/70825
359/820
2003/0030920 A1 2/2003 Okawara
(Continued)

FOREIGN PATENT DOCUMENTS

JP    6-174991 A    6/1994
JP    9-184951 A    7/1997
(Continued)

OTHER PUBLICATIONS

International Preliminary Report on Patentability (PCT/IPEA/409) for PCT/JP2015/055108 completed on Sep. 14, 2015.
(Continued)

*Primary Examiner* — W B Perkey
(74) *Attorney, Agent, or Firm* — Birch, Stewart, Kolasch & Birch, LLP (57) ABSTRACT

This invention provides a lens device and a correction method therefor whereby the focal position of the lens device can be corrected with high accuracy even if a lens surface shape or the like is not uniform. A ring-shaped lens fixing frame 52 is mounted on the outer periphery of a lens 51. A gear 53 is formed on the lens fixing frame 52 in the circumferential direction. A gear 54, which engages with the gear 53, is rotated by a motor 20A. Then, the lens 51 rotates about the optical axis L thereof. Further, a rack 57, which extends in the direction of the optical axis L, is formed on a part of the lens fixing frame 52. A pinion 58 engages with the teeth 57A of the rack 57, and the pinion 58 is rotated by another motor 20B. Then, the rack 57 moves in the direction of the optical axis L, and thus the lens 51 moves in the direction of the optical axis L. Since the lens 51 rotates about the optical axis L thereof, even if the surface shape or the like of the lens 51 is uneven in the circumferential direction, improvement can be realized.

11 Claims, 10 Drawing Sheets

(51) Int. Cl.
*G02B 15/04* (2006.01)
*G02B 7/10* (2006.01)
*G02B 7/09* (2006.01)
*G02B 7/00* (2006.01)

(52) U.S. Cl.
CPC ............... *G02B 7/102* (2013.01); *G02B 7/16* (2013.01); *G02B 15/04* (2013.01)

(56) References Cited

U.S. PATENT DOCUMENTS

| | | | | |
|---|---|---|---|---|
| 2016/0007019 | A1* | 1/2016 | Otani | G03B 17/18 348/187 |
| 2016/0341941 | A1* | 11/2016 | Shimotsu | G02B 7/005 |
| 2016/0349479 | A1* | 12/2016 | Toyama | G02B 7/04 |

FOREIGN PATENT DOCUMENTS

| JP | 10-186209 A | 7/1998 |
|---|---|---|
| JP | 11-23944 A | 1/1999 |
| JP | 2003-57528 A | 2/2003 |
| JP | 2004-233892 A | 8/2004 |
| JP | 2006-64986 A | 3/2006 |
| JP | 2007-80318 A | 3/2007 |
| JP | 9-35322 A | 3/2014 |
| JP | 2014-44319 A | 3/2014 |

OTHER PUBLICATIONS

International Search Report (PCT/ISA/210) for PCT/JP2015/055108 dated May 19, 2015.
Written Opinion of the International Searching Authority(PCT/ISA/237) for PCT/JP2015/055108 dated May 19, 2015.
Chinese Office Action dated Mar. 16, 2018, for corresponding Chinese Application No. 201580015147.0, with an English translation.

* cited by examiner

| POSITION | P1 | P2 | P3 | P4 | ...... |
|---|---|---|---|---|---|
| ROTATION ANGLE | $\theta 1$ | $\theta 2$ | $\theta 3$ | $\theta 4$ | ...... |

FIG. 7

| ZOOM RATIO | Z1 | Z2 | Z3 | Z4 | ...... |
|---|---|---|---|---|---|
| AMOUNT OF VARIATION IN FOCAL POSITION | V1 | V2 | V3 | V4 | ...... |

FIG. 8

| APERTURE VALUE | F1(OPEN) | F2 | F2 | F3 | F4 | ...... |
|---|---|---|---|---|---|---|
| AMOUNT OF VARIATION IN FOCAL POSITION | V11 | V12 | V13 | V14 | V15 | ...... |

FIG. 9

| ZOOM RATIO | APERTURE VALUE | AMOUNT OF VARIATION IN FOCAL POSITION |
|---|---|---|
| Z1 | F1 | V21 |
| | F1.4 | V22 |
| | F2 | V23 |
| | ⋮ | ⋮ |
| Z2 | F1 | V31 |
| | F1.4 | V32 |
| | ⋮ | ⋮ |

LENS DEVICE AND CORRECTION METHOD FOR LENS DEVICE

CROSS-REFERENCE TO RELATED APPLICATIONS

This application is a Continuation of PCT International Application No. PCT/JP2015/055108 filed on Feb. 24, 2015, which claims priority under 35 U.S.C. §119(a) to Japanese Patent Application No. 2014-067470 filed Mar. 28, 2014. Each of the above application(s) is hereby expressly incorporated by reference, in its entirety, into the present application.

BACKGROUND OF THE INVENTION

1. Field of the Invention

This invention relates to a lens device and a correction method for the lens device.

2. Description of the Related Art

There has been a progress in lens performance, and thus there has been a demand for lens position adjustment at a level which cannot be supported in conventional lens processing and adjustment. In particular, in a lens having performance superior to that of a high-definition television broadcast system, an effect of the adjustment is significant. For example, on the basis of respective functions, box-type lenses can be classified into five parts of a focus lens group, a zoom lens group, a vibration-proof lens group, an extender, and a master lens group. In a theoretical lens shape and mechanical components, focal positions at zoom positions are predetermined. However, the focal position is shifted due to an abnormal state caused by a lens surface shape, processing errors in mechanical dimensions, and the like, and thus a phenomenon, in which a focal position is minutely shifted in accordance with the zoom position, occurs (zooming focus shift). Further, also in a diaphragm which is disposed behind the zoom lens group, a phenomenon, in which the focal position is shifted, occurs (stopping focus shift).

In the conventional art, such a change has been dealt with by selection of mechanical components or the like. However, the conventional art is unable to achieve performance superior to that of a high-definition television broadcast system, and thus it is not possible to obtain desired performance.

Hence, there is a lens in which on the basis of the correspondence relationship between the zoom positions and the focal positions, a position of a focus lens is adjusted in accordance with the zoom position (JP2004-233892A). Further, there is a lens in which a focal position is corrected in accordance with the zoom position (JP2003-57528A), and also there is a lens in which correction is performed on only a master lens group (JP1998-186209A (JP-H10-186209A)).

SUMMARY OF THE INVENTION

However, in any of JP2004-233892A, JP2003-57528A, and JP1998-186209A (JP-H10-186209A), it is not possible to accurately correct a focal position. For example, in the description of JP2003-57528A, correction of a focus shift amount is performed using a focus lens group, but a weight of the focus lens group is heavy. Accordingly, it is difficult to increase a speed of the correction. Further, in the description of JP1998-186209A (JP-H10-186209A), correction of a focus shift amount is performed using a master lens group, but a stroke of adjustment of the master lens group reaches an upper limit in correction. Therefore, in a case where a zoom lens group is set on a telephoto side, sufficient correction is not performed. In particular, in a case where a lens surface shape or a refractive index is not uniform, if such an effect is not eliminated, it is not possible to perform sufficient correction.

This invention has an object to correct a focal position with high accuracy even in a case where the lens surface shape or the refractive index is not uniform.

A lens device according to this invention comprises: a plurality of lenses; a lens moving mechanism that moves one or more lenses, which are included in the plurality of lenses, in a direction of an optical axis of the plurality of lenses; a storage section that stores a plurality of positions of the plurality of lenses in the direction of the optical axis and a plurality of rotation angles respectively corresponding to the plurality of positions; and a lens rotating mechanism that rotates at least one lens, which are included in the plurality of lenses, about the optical axis of the lens by a rotation angle corresponding to a position of the lens, which is moved by the lens moving mechanism, in the direction of the optical axis, among the plurality of rotation angles stored in the storage section, and that is driven separately from the lens moving mechanism. The lens rotating mechanism, which can be driven separately from the lens moving mechanism, is defined as a lens rotating mechanism on which operations of the lens moving mechanism have no effect.

This invention also provides a correction method for the lens device. That is, in a correction method for a lens device having a plurality of lenses, a lens moving mechanism moves one or more lenses, which are included in the plurality of lenses, in a direction of an optical axis of the plurality of lenses, a storage section stores a plurality of positions of the plurality of lenses in the direction of the optical axis and a plurality of rotation angles respectively corresponding to the plurality of positions, and a lens rotating mechanism can be driven separately from the lens moving mechanism, and rotates at least one lens, which are included in the plurality of lenses, about the optical axis of the lens by a rotation angle corresponding to a position of the lens, which is moved by the lens moving mechanism, in the direction of the optical axis, among the plurality of rotation angles stored in the storage section.

The at least one lens, which is rotated by the lens rotating mechanism, is a lens, of which at least one of a surface shape or a refractive index is relatively uneven in a circumferential direction orthogonal to the optical axis and centered on the optical axis, among the plurality of lenses.

The at least one lens, which is rotated by the lens rotating mechanism, may be a lens, of which an optical sensitivity is relatively low, among the plurality of lenses.

In a case where the lens device includes a zoom optical system, the lens, which is moved by the lens moving mechanism, may be a lens included in the zoom optical system.

The plurality of lenses may include a focus optical system that is moved by a first movement unit so as to thereby adjust a focal position, a master optical system that is moved by a second movement unit, which is smaller than a movement unit of the focus optical system, so as to thereby adjust the focal position, and a zoom optical system that changes a zoom ratio. Further, the lens device may further comprise: a diaphragm that restricts an amount of incident light; and adjustment control means for performing at least one of adjustment of the focal position performed by the focus optical system or adjustment of the focal position performed by the master optical system, on the basis of an amount of variation in focal position which is predetermined to correspond to the zoom ratio of the zoom optical system or an aperture value of the diaphragm.

The lens device may further comprise a memory that stores an amount of adjustment of the focal position.

As adjustment of the focal position performed by the adjustment control means, only adjustment of the focal position based on movement of the focus optical system is performed if the zoom ratio is at a telephoto end, or only adjustment of the focal position based on movement of the master optical system is performed if the zoom ratio is at a wide-angle end.

In accordance with the amount of variation in focal position, the amount of adjustment of the focal position based on the movement of the focus optical system may be larger at a position closer to the telephoto end and may be smaller at a position closer to the wide-angle end, and the amount of adjustment of the focal position based on the movement of the master optical system may be larger at a position closer to the wide-angle end and may be smaller at a position closer to the telephoto end.

In accordance with the amount of variation in focal position, in a case of an aperture value at which an opening of the diaphragm is minimized, only the adjustment of the focal position based on the movement of the focus optical system may be performed, and in a case of an aperture value at which the opening of the diaphragm is maximized, only the adjustment of the focal position based on the movement of the master optical system may be performed.

In accordance with the amount of variation in focal position, the amount of adjustment of the focal position based on the movement of the focus optical system may be larger at an aperture value closer to an aperture value at which the opening of the diaphragm is minimized, and may be smaller at an aperture value closer to an aperture value at which the opening of the diaphragm is maximized, and the amount of adjustment of the focal position based on the movement of the master optical system may be larger if a size of the opening of the diaphragm is closer to a maximum thereof and may be smaller if the size of the opening of the diaphragm is closer to a minimum thereof.

According to this invention, the plurality of positions of the plurality of lenses in the direction of the optical axis and the plurality of rotation angles respectively corresponding to the plurality of positions are stored. The lens is rotated about the optical axis by a rotation angle corresponding to the position of the moved lens in the direction of the optical axis, separately from the movement of the lens in the direction of the optical axis. In accordance with the position in the direction of the optical axis, such a rotation angle of the lens as that which eliminates non-uniformity in the lens surface shape, the refractive index, and the like is stored. Thereby, it is possible to eliminate adverse effects caused by non-uniformity in the lens surface shape, the refractive index, and the like. It is possible to correct the focal position with high accuracy even in a case where the lens surface shape or the refractive index is not uniform.

DESCRIPTION OF THE PREFERRED EMBODIMENTS

Figure 1:
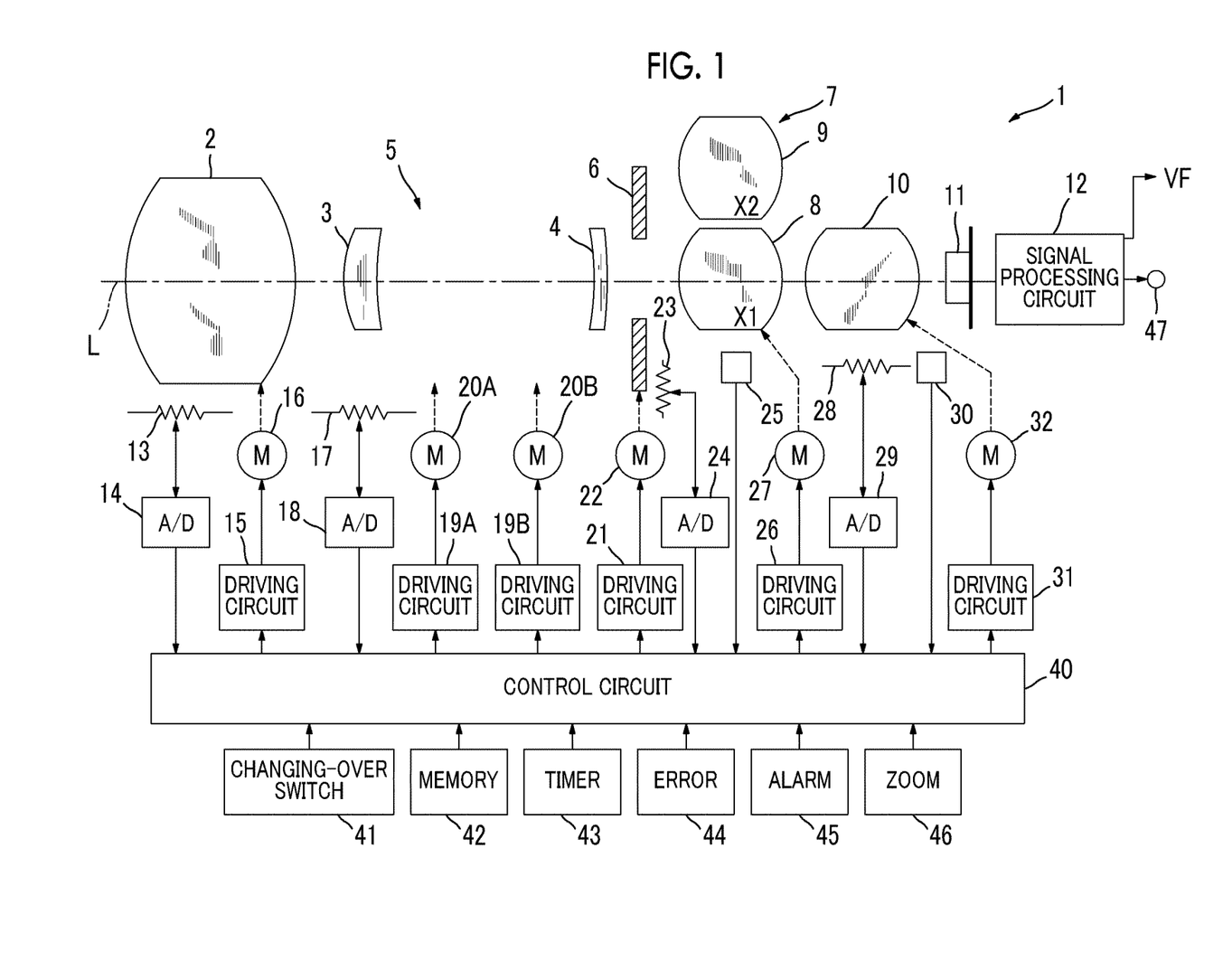
FIG. 1 shows an optical configuration and an electrical configuration of a television camera lens.

FIG. 1 is a block diagram illustrating an electric configuration of a television camera lens (lens device) 1.

All operations of the television camera lens 1 are integrally controlled by a control circuit 40.

The television camera lens 1 includes an imaging element 11. A focus optical system 2 including a single or a plurality of lenses, a zoom optical system 5 that changes a zoom ratio, a diaphragm 6, an extender lens (group) 7, and a master optical system 10 including a single or a plurality of lenses are disposed in front of the imaging element 11. The optical axis L of the television camera lens 1 passes through centers of the light receiving surfaces of a focus optical system 2, a zoom optical system 5, a diaphragm 6, a master optical system 10, and an imaging element 11. The zoom optical system 5 includes a single or a plurality of variable power system lenses 3 and a single or plurality of correction system lenses 4. In the extender lens 7, an imaging lens 8 having an imaging magnification of 1× and an imaging lens 9 having an imaging magnification of 2× are mounted on a turret board (not shown in the drawing). The turret board of the extender lens 7 rotates in accordance with a switching control signal issued from a changing-over switch 41. Then, either one of the imaging lens 8 having a magnification of 1× or the imaging lens 9 having a magnification of 2× is positioned on the optical axis L.

A detector 13 detects lens positions of the lenses included in the focus optical system 2. A detection signal, which indicates the lens positions of the lenses included in the focus optical system 2 detected by the detector 13, is converted into digital detection data in an analog/digital conversion circuit 14, and is input to the control circuit 40. A user sets an amount of focus by turning a focus ring (not shown in the drawing). The control circuit 40 compares the set amount of focus and the detected lens positions of the lenses included in the focus optical system 2 represented by the digital detection data. On the basis of the result of the comparison, data, which indicates an amount of driving of the lenses included in the focus optical system 2, is generated. The data, which indicates the generated amount of driving, is given to the driving circuit 15, and the driving circuit 15 controls a focus motor 16. Thereby, the lens positions of the lenses included in the focus optical system 2 are adjusted.

The variable power system lens 3 constituting the zoom optical system 5 changes a focal length, and the correction system lens 4 performs correction so as not to change the focal position. If a zoom command issued from a zoom button 46 is given to the control circuit 40, the control circuit 40 controls a driving circuit 19A, and causes the motor 20A to rotate. The motor 20A moves at least one of the variable power system lens 3 or the correction system lens 4 on the optical axis L. As might be expected, by rotating a zoom cam barrel (not shown in the drawing) that rotates in accordance with rotation of a zoom ring (not shown in the drawing) operated by a user, the variable power system lens 3 and the correction system lens 4 may be moved along the optical axis L in a fixed relationship. The detector 17 detects a zoom position of the zoom optical system 5. The detection signal, which is output from the detector 17, is converted into the digital detection data in the analog/digital conversion circuit 18, and is input to the control circuit 40. The control circuit 40 compares an amount of zooming, which is set using a zoom ring, and the detected lens positions of the lenses included in the zoom optical system 5 represented by the digital detection data. On the basis of the result of the comparison, data, which indicates an amount of driving of the lenses included in the zoom optical system 5, is generated. The data, which indicates the generated amount of driving, is given to the driving circuit 19, and the driving circuit 19A controls a zoom motor 20A. Thereby, the lens positions of the variable power system lens 3 and the correction system lens 4 constituting the zoom optical system 5 are adjusted.

In this example, the lenses included in the zoom optical system 5 are rotated about the optical axis L. Hence, the television camera lens 1 includes a driving circuit 19B and a motor 20B. The driving circuit 19B drives the motor 20B, whereby it is possible to rotate a desired lens, which is included in the zoom optical system 5, about the optical axis L.

The detector 23 detects an amount of aperture of the diaphragm 6. The detection signal, which is output from the detector 23, is converted into the digital detection data by the analog/digital conversion circuit 24, and is input to the control circuit 40. Further, data, which indicates an amount of driving, is generated in accordance with an amount of rotation of a diaphragm ring (not shown in the drawing) operated by a user. The data, which indicates the generated amount of driving, and the data, which indicates the detected amount of driving, are compared. On the basis of the result of the comparison, data, which indicates the amount of driving of the diaphragm 6, is generated. The data, which indicates the generated amount of driving, is given to the driving circuit 21, and the driving circuit 21 controls a diaphragm motor 22. Thereby, the diaphragm 6 is set at a desired aperture value.

A photo interrupter (detector) 25 is provided in the vicinity of the extender lens 7. The photo interrupter 25 detects whether either one of imaging lenses 8 or 9 constituting the extender lens 7 is positioned on the optical axis L. An output signal issued from the photo interrupter 25 is input to the control circuit 40, and it is detected whether the imaging lens 8 or 9 designated by the changing-over switch 41 is positioned on the optical axis L. If the imaging lens 8 or 9 designated by the changing-over switch 41 is positioned on the optical axis L, the designated imaging lens 8 or 9 is positioned on the optical axis L, and the driving data is generated by the control circuit 40, and is given to the driving circuit 26. The driving circuit 26 controls the extender motor 27 such that the imaging lens 8 or 9 is positioned on the optical axis L.

A flange-back adjustment knob 30, which is for setting an amount of adjustment of the master optical system 10 including a single or a plurality of lenses, is provided. Data, which indicates the amount of adjustment that is set by the knob 30, is input to the control circuit 40. Further, a detection signal, which is output from a potentiometer (detector) 28 that detects the amount of movement of the master optical system 10, is input to the analog/digital conversion circuit 29, is converted into digital detection data, and is input to the control circuit 40. The data, which indicates the amount of adjustment that is set by the knob 30, and the digital detection data, which indicates the amount of movement of the master optical system 10, are compared in the control circuit 40. On the basis of the result of the comparison, the driving data is generated. The generated driving data is given to the driving circuit 31, and the master lens motor 32 is driven. The master optical system 10 moves along the optical axis L, whereby focus correction is performed such that a subject image is in focus on the imaging surface of the imaging element 11.

A video signal, which is output from the imaging element 11, is input to the signal processing circuit 12, and signal processing such as sampling processing, white color balance adjustment, and gamma correction is performed, whereby a television signal is generated. The generated television signal is output to a viewfinder, is reproduced thereon, and is given to an output terminal 47.

The control circuit 40 is connected with a memory 42, a timer 43 that measures date and time, an error LED 44 that emits light in order to notify a user or the like that the optical system constituting the television camera lens 1 fails, and a warning LED 45 that emits light in order to give a warning when failure is highly likely to occur.

Figure 2:
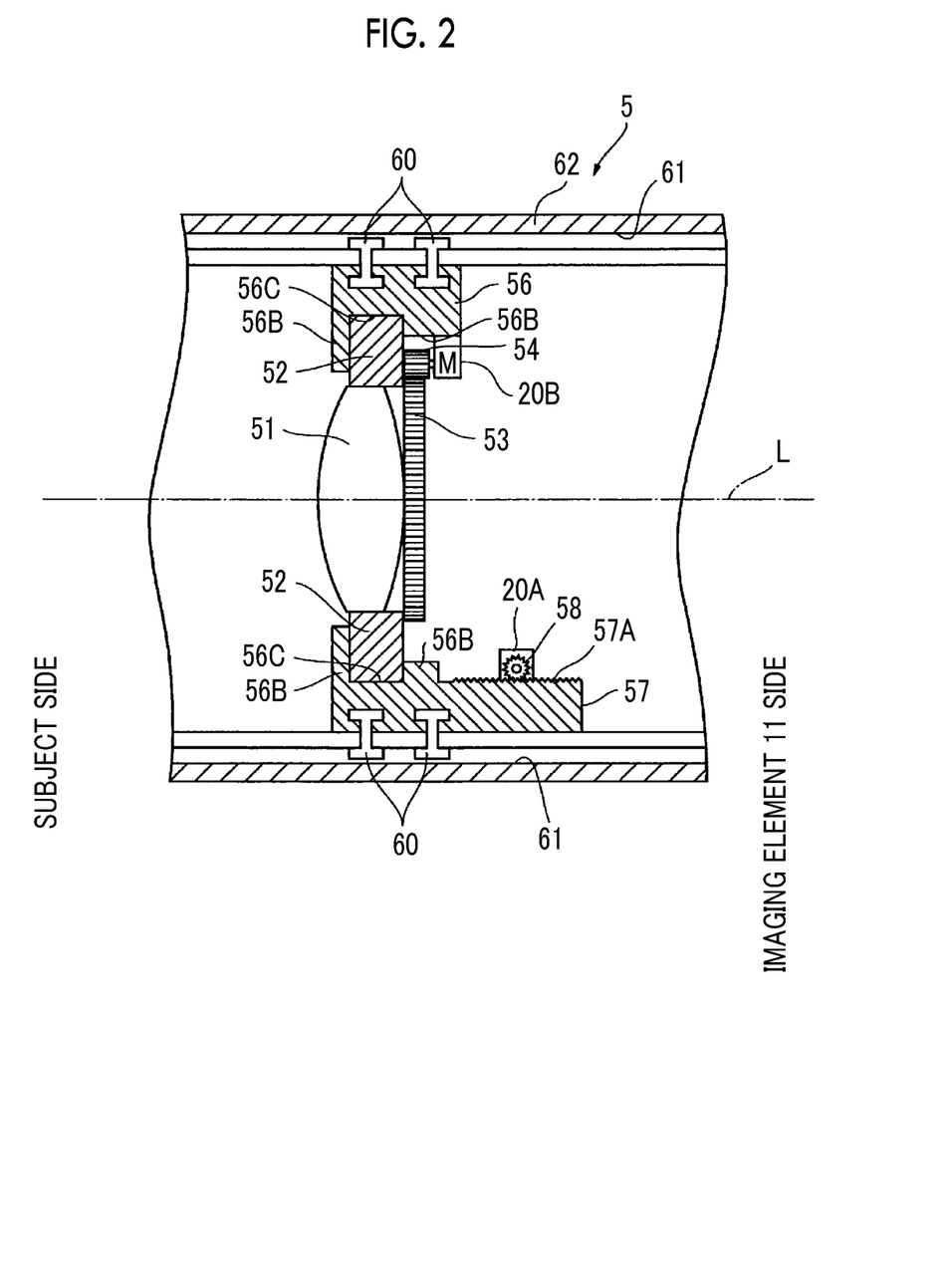
FIG. 2 shows a lens moving mechanism and a lens rotating mechanism.
Figure 3:
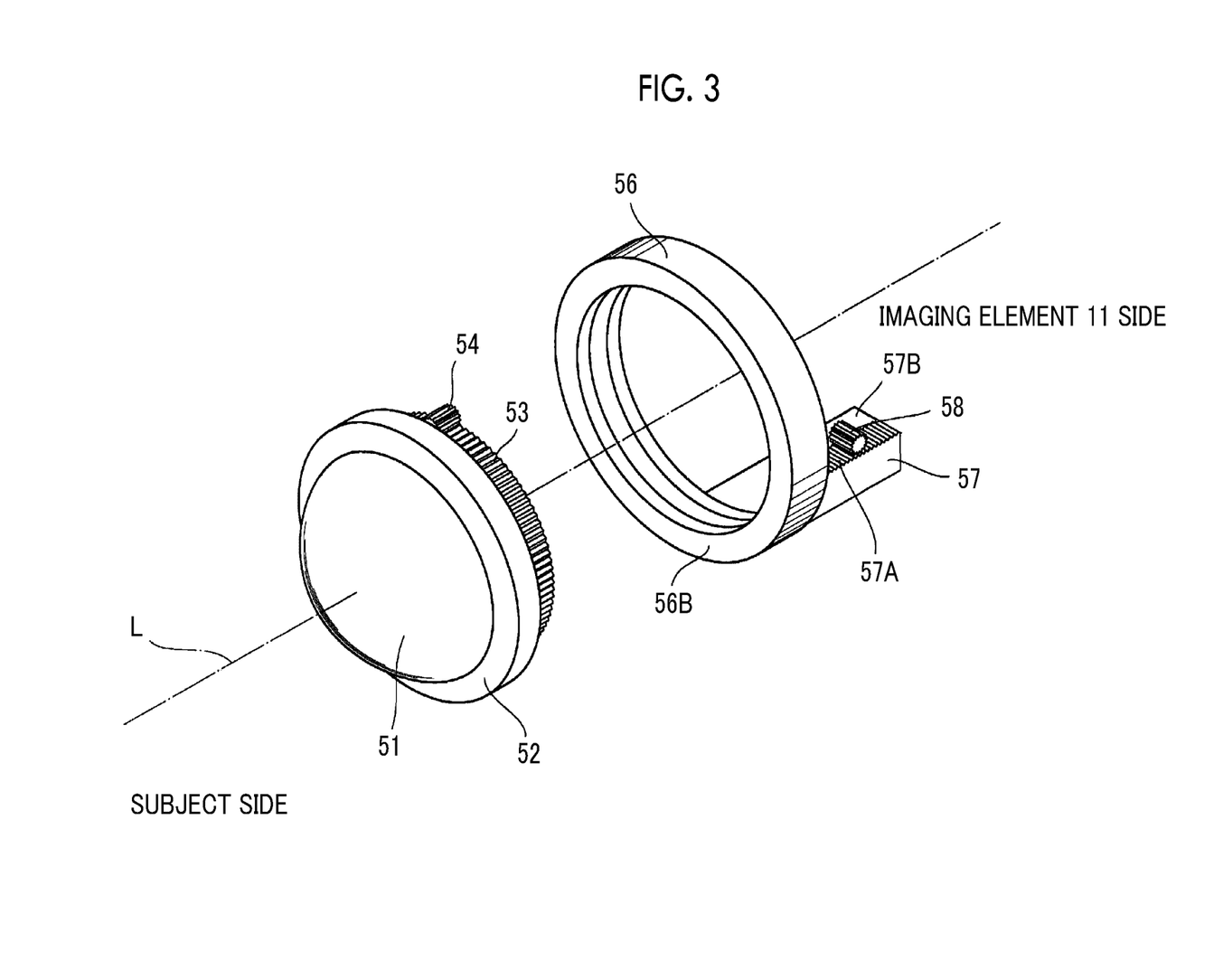
FIG. 3 is an exploded perspective view of a lens, a lens fixing frame, and a lens holding frame.
Figure 4:
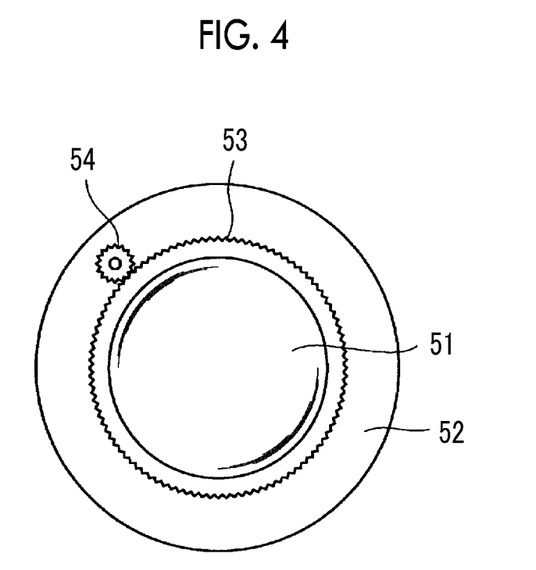
FIG. 4 is a rear view of a lens onto which a lens fixing frame is fixed.
Figure 5:
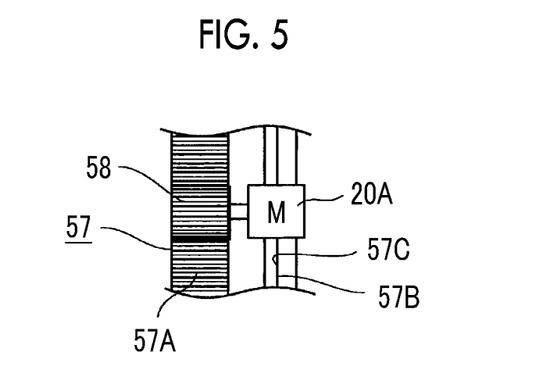
FIG. 5 is a plan view illustrating a rack.

FIG. 2 is a partial sectional view of the zoom optical system 5. FIG. 3 is an exploded perspective view of a lens 51 and the like included in the zoom optical system 5. FIG. 4 is a rear view of the lens 51 and the like viewed from the side of the imaging element 11. FIG. 5 is a plan view illustrating parts constituting a part of a lens moving mechanism that moves the lens 51 and the like in a direction of the optical axis L.

A lens fixing frame 52, of which the inner peripheral surface is fixed onto the outer peripheral surface of the lens 51, is mounted on the outer peripheral surface of the lens 51. A gear 53 is formed to be closer to the inner side than the outer peripheral surface of the lens fixing frame 52 in a circumferential direction, in a section of the lens fixing frame 52 on the imaging element 11 side (refer to FIG. 4).

A lens holding frame 56 surrounding the outer periphery of the lens fixing frame 52 is provided. As shown in FIG. 2, two flanges 56B are formed in the direction of the optical axis L with an inner peripheral surface 56C of the lens holding frame 56 interposed therebetween. The flanges 56B enables the lens 51 (lens fixing frame 52) to rotate about the optical axis L without shift in the direction of the optical axis L relative to the lens holding frame 56. A ball bearing may be provided between the inner peripheral surface 56C of the lens holding frame 56 and the outer peripheral surface of the lens fixing frame 52. The lens 51 smoothly rotates.

The motor 20B is fixed onto the lens holding frame 56, and the gear 54 is fixed onto the shaft of the motor 20B. The gear 54 engages with the gear 53 of the lens fixing frame 52. By driving the motor 20B, the lens fixing frame 52 rotates, and thereby the lens 51 rotates about the optical axis L.

One end of a plurality of pins 60 is fixed onto the lens holding frame 56. The other end of these pins 60 is inserted into a guiding groove 61 which is formed in a barrel 62 of the zoom optical system 5. The guiding groove 61 is formed in the direction of the optical axis L. By moving the pins 60 along the guiding groove 61, the lens holding frame 56 (lens 51) is able to move in the direction of the optical axis L.

A rack 57, which protrudes in the direction of the optical axis L, is formed on a part of the lens holding frame 56. Teeth 57A formed on the rack 57 engages with a pinion 58. A shaft of the above-mentioned motor 20A is fixed onto the pinion 58.

Referring to FIG. 5, the rack 57 includes a part in which the teeth 57A are formed and a part 57B in which the teeth 57A are not formed. The motor 20A is disposed on the part 57B in which the teeth 57A are not formed. The guiding groove 57C is formed in the direction of the optical axis L in the part 57B in which the teeth 57A are not formed, and a regulation pin (not shown in the drawing), which protrudes downward (downward in FIG. 2) from the motor 20A, is inserted into the guiding groove 57C. If the motor 20A is driven, the pinion 58 rotates, and the rack 57 moves in the direction of the optical axis L. Therefore, the lens 51 also moves in the direction of the optical axis L. The motor 20A is fixed onto the part 57B in which the teeth 57A of the rack 57 are not formed, and is fixed onto the inner peripheral surface of the barrel 62. The motor 20A does not move together with the rack 57, and the lens 51 moves in the direction of the optical axis L.

The motor 20A, the pinion 58, the rack 57, the lens holding frame 56, the lens fixing frame 52, the pins 60, and the guiding groove 61 constitute the lens moving mechanism that moves the lens 51 in the direction of the optical axis L. The lens moving mechanism may move not a single lens but a plurality of lenses (one or more lenses) in the direction of the optical axis L. Further, the motor 20B, the gear 54, the lens fixing frame 52, and the lens holding frame 56 constitute a lens rotating mechanism that rotates the lens 51 about the optical axis L and can be driven separately from the lens moving mechanism. The lens rotating mechanism, which can be driven separately from the lens moving mechanism, is able to rotate the lens 51 about the optical axis L without being affected by (regardless of) the movement of the lens 51 moved by the lens moving mechanism.

Figure 6:
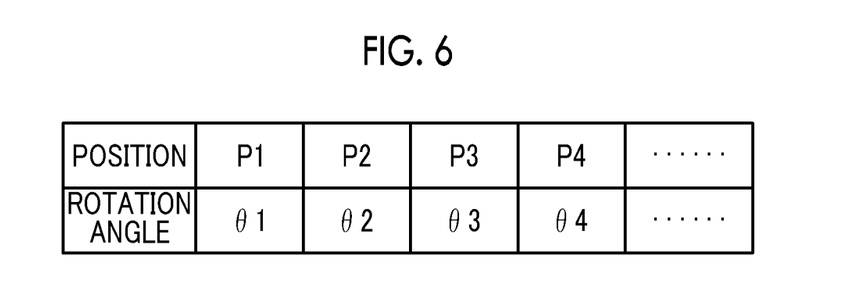
FIG. 6 is an example of a table of positions and rotation angles.

FIG. 6 is an example of a position/rotation angle table illustrating a relationship between positions of the lens 51 and rotation angles of the lens 51.

In this example, the plurality of positions of the lens 51 in the direction of the optical axis L and the plurality of rotation angles respectively corresponding to the plurality of positions are stored in the memory (storage section) 42 as the position/rotation angle table. If the lens 51 is set at the position in the direction of the optical axis L, the lens rotating mechanism rotates the lens 51 about the optical axis L by a rotation angle which is stored in association with the set position. As described above, the lens rotating mechanism can be driven separately from the lens moving mechanism by rotating at least one lens, which is included in the optical system, in the optical axis L of the optical system, by a rotation angle, which corresponds to a position of the lens moved by the lens moving mechanism in the direction of the optical axis L, among the plurality of rotation angles stored in the memory (storage section) 42. For example, if the lens 51 is set at a position P1, the lens 51 is rotated by an angle of θ1. It is needless to say that the reference position of the lens 51 in the rotation direction is set and the rotation is performed by the motor 20B on the basis of the reference position. If necessary, a reference mark is attached to the lens fixing frame 52, and a sensor detects the mark, whereby the lens 51 can be rotated on the basis of the rotation reference position of the lens 51 and the rotation angle which is determined on the basis of the rotation reference position.

For example, the position/rotation angle table stores a relationship between the rotation angles and the positions in the direction of the optical axis L such as minimizes (reduces) aberrations by rotating the lens. By rotating the lens in accordance with the set position, aberrations in the television camera lens 1 are reduced. It is needless to say that if there are lenses which are rotated other than the lens 51, the rotation angle of the lens 51 is determined such that aberration is reduced in consideration of the rotation angles of the other lenses.

In the above-mentioned example, the lens 51, which is included in the zoom optical system 5, is rotated. However, not a lens, which is included in the zoom optical system 5, but one or more lenses, which are included in the plurality of lenses of the focus optical system 2, the master optical system 10, the other optical systems, and the like, may be rotated about the optical axis L in accordance with the position thereof in the direction of the optical axis L. Further, one or more lenses, which are rotated, may be lenses, of which at least one of a lens surface shape or a refractive index is relatively not uniform in a circumferential direction that is orthogonal to the optical axis L and is centered on the optical axis L, among the plurality of lenses included in the television camera lens 1. It is possible to reduce aberrations and the like which are caused by non-uniformity in the lens surface shape and the refractive index. A degree of non-uniformity may indicate non-uniformity in the circumferential direction as well, and thus whether non-uniformity occurs is detected on the basis of for example a variance value. Further, relatively whether non-uniformity occurs can be determined on the basis of whether the variance value is greater than a median value or an average value in a case where a plurality of lenses included in the television camera lens 1 are arranged in an order of non-uniformity.

At least one lens rotated by the lens rotating mechanism may be a lens, of which an optical sensitivity (lens power) is relatively low, among the plurality of lenses. It can be determined whether a lens has a relatively low optical sensitivity, on the basis of whether the optical sensitivity is equal to or less than median values or average values of the optical sensitivities of the plurality of lenses included in the television camera lens 1.

Figure 7:
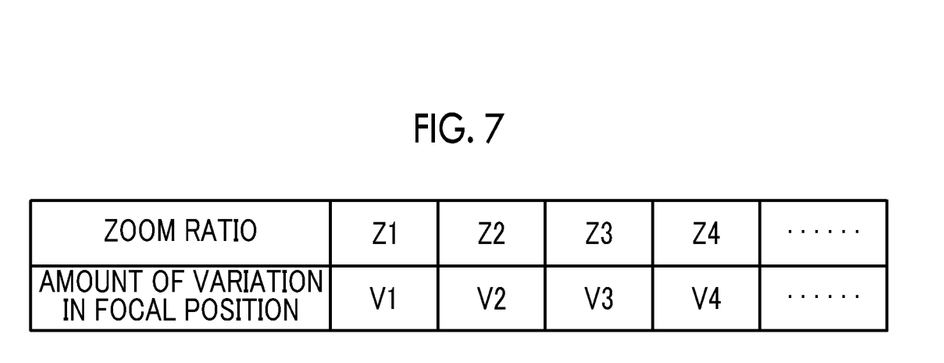
FIG. 7 is an example of a table of zoom ratios and amounts of variation in focal position.

FIG. 7 is an example of a zoom ratio/amount of variation table that indicates the zoom ratios and the amounts of variation in focal position. This table is also stored in the memory (storage section) 42.

The focal position is theoretically fixed regardless of the zoom ratio. However, the focal position is shifted due to the lens surface shape, the processing error, the zoom ratio, and the like (zooming focus shift). In this example, the amount of variation in focal position, which is shifted due to the zoom ratio, is stored in advance, and the amount of variation is adjusted in accordance with the zoom ratio at the time of actually using the television camera lens 1.

The zoom ratio corresponds to Z1, Z2, Z3, Z4, and the like, the amount of variation in focal position is measured in advance as V1, V2, V3, V4, and the like, and those are stored.

Figure 8:
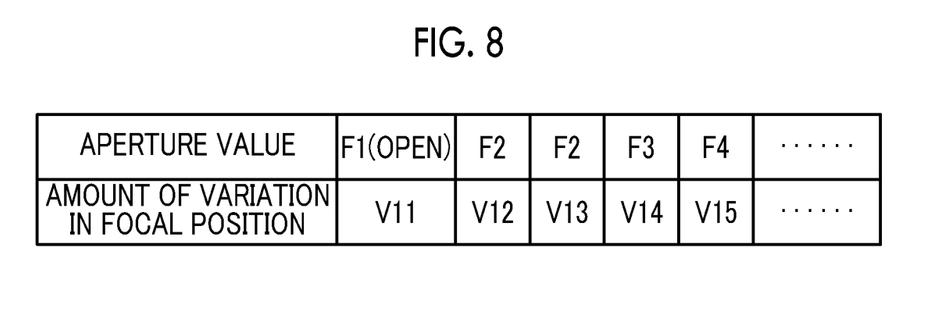
FIG. 8 is an example of a table of aperture values and the amounts of variation in focal position.

FIG. 8 is an example of the aperture value/amount of variation table that indicates the aperture values and the amounts of variation in focal position. Also, this table is stored in the memory (storage section) 42.

Like the zooming focus shift, theoretically, the focal position is fixed regardless of the aperture value. However, in practice, the focal position may be shifted due to the aperture value (stopping focus shift). In this example, the amount of variation in focal position, which is shifted due to the aperture value, is stored in advance, and the amount of variation is adjusted in accordance with the aperture value at the time of actually using the television camera lens 1.

In accordance with F1 (open diaphragm), F1.4, F2, F2.8, F4, and the like as the aperture value, the amount of variation in focal position is measured as V11, V12, V13, V14, V15, and the like in advance, and those are stored.

Figure 9:
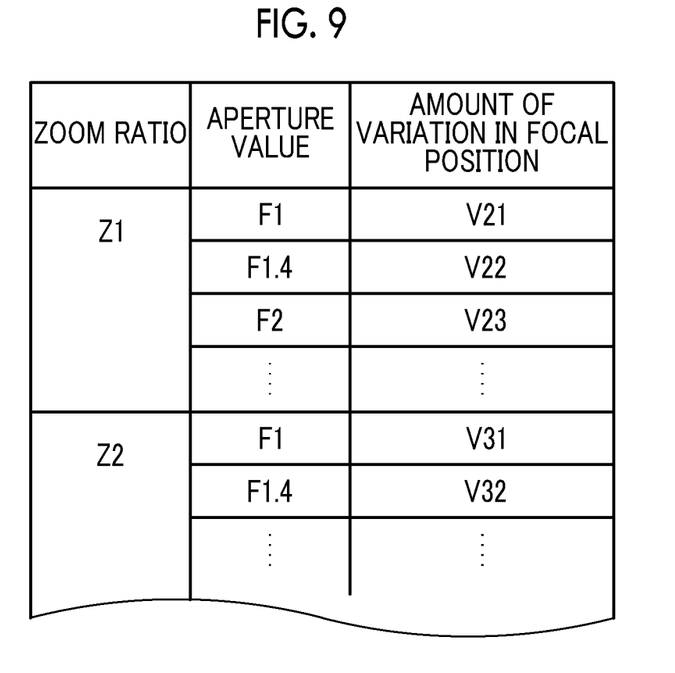
FIG. 9 is an example of a table illustrating a relationship between the zoom ratios, the aperture values, and the amounts of variation.

FIG. 9 is an example of a table illustrating the amounts of variation in focal position corresponding to the zoom ratios and the aperture values. This table is also stored in the memory (storage section) 42.

As described above, in accordance with the zoom ratios or the aperture values, the amounts of variation in focal position are stored. At the time of using the television camera lens 1, the amounts of variation may be adjusted. However, the amounts of variation in focal position corresponding to both the zoom ratios and the aperture values may be stored. In the table shown in FIG. 9, the amounts of variation are stored.

The amounts of variation in focal position are stored in the table in association with the set zoom ratios and the set aperture values. The amounts of variation, which are stored in association with the zoom ratios and the aperture values that are set in actual use, are read, and the read amounts of variation are adjusted. More specifically, focal position adjustment can be achieved.

Figure 10:
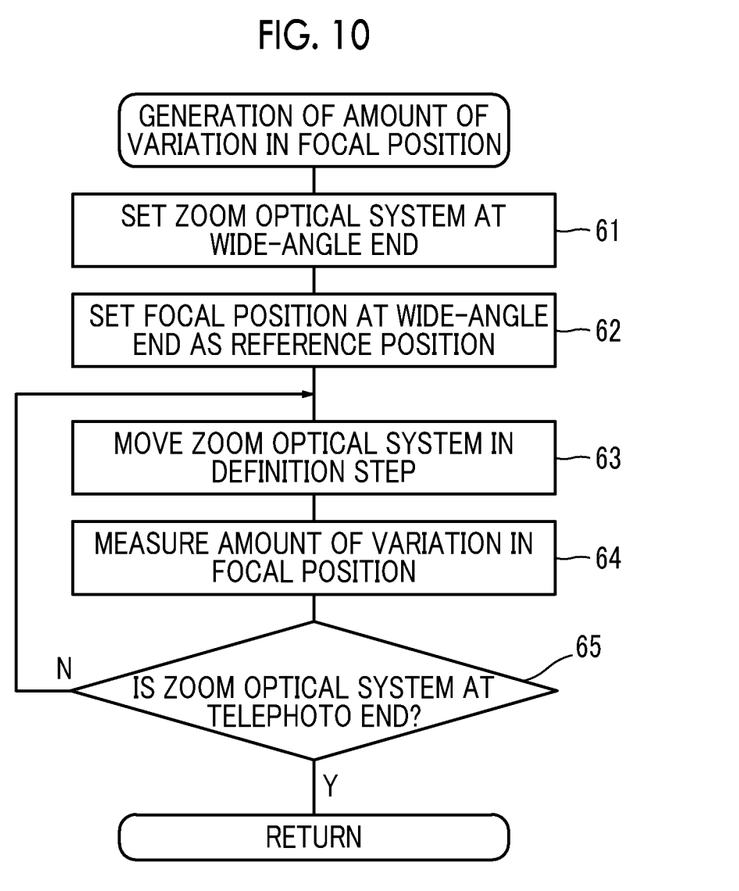
FIG. 10 is a flowchart illustrating a procedure of processing of generating the amounts of variation in focal position.

FIG. 10 is flowchart illustrating a procedure of processing of generating the amounts of variation in focal position in the zoom ratio/amount of variation in focal position table shown in FIG. 7. The processing is performed in an ex-factory state of the television camera lens 1.

First, the zoom optical system 5 is set at the wide-angle end (step 61). A shift Δ of the focal position at the wide-angle end is detected, and the focal position at the wide-angle end is set as a reference position (step 62). If the zoom ratio at the wide-angle end is Z1, the shift Δ of the focal position is equal to the amount of variation in focal position V1. The lens included in the zoom optical system 5 is moved in a definition step (step 63), and the above-mentioned zoom ratio is set. For example, if the zoom ratio at the wide-angle end is Z1, the zoom ratio is set as Z2. The amount of variation in focal position Δ1 at the zoom ratio is measured (step 64). The amount of variation V2 at the zoom ratio Z2 is equal to Δ+Δ1. Until the zoom optical system 5 reaches the telephoto end, processing in steps 63 and 64 is repeated (step 65).

Through such processing, it is possible to obtain a table shown in FIG. 7.

The aperture value/amount of variation table shown in FIG. 8 can also be obtained by measuring the amount of variation in focal position for each aperture value. Further, a table shown in FIG. 9 can also be obtained by measuring the amount of variation in focal position for each zoom ratio and for each aperture value.

Figure 11:
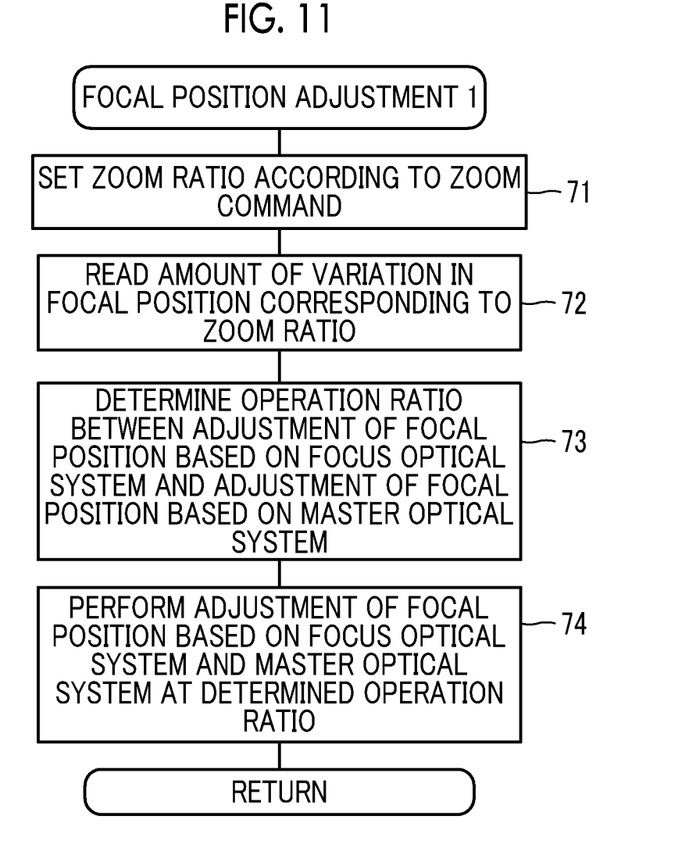
FIG. 11 is a flowchart illustrating a procedure of processing of adjusting the focal position.

FIG. 11 is a flowchart illustrating a procedure of processing of adjusting the focal position on the basis of the table shown in FIG. 7.

The zoom optical system 5 is set at the zoom ratio according to the zoom command issued from a user (step 71) (the lens included in the zoom optical system 5 is moved in the direction of the optical axis). In this case, it is preferable that, as described above, if the moved lens is a lens that rotates about the optical axis, as shown in FIG. 6, the lens is rotated by a rotation angle corresponding to the moved position.

The amount of variation in focal position corresponding to the set zoom ratio is read from the table shown in FIG. 7 (step 72). From the read amount of variation, an operation ratio between the focal position adjustment performed by the focus optical system 2 and the focal position adjustment performed by the master optical system 10 is determined (step 73). For example, the operation ratio is determined as follow: at a position closer to the telephoto end, the amount of adjustment of the focal position based on movement of the focus optical system 2 is larger, and the amount of adjustment of the focal position based on movement of the master optical system 10 is smaller; and at a position closer to the wide-angle end, the amount of adjustment of the focal position based on movement of the focus optical system 2 is smaller, and the amount of adjustment of the focal position based on movement of the master optical system 10 is larger. By moving the focus optical system 2 in a first movement unit, the focal position thereof is adjusted. By moving the master optical system 2 in a second movement unit smaller than the first movement unit, the focal position thereof is adjusted. At a position closer to the telephoto end, the amount of variation in focal position is larger, and thus a percentage of the adjustment of the position adjusted by the focus optical system 2 having a larger movement unit is larger. As a result, it is possible to achieve faster adjustment. Further, at a position closer to the wide-angle end, the amount of variation in focal position is smaller, and thus a percentage of the adjustment of the position adjusted by the master optical system 10 having a smaller movement unit is smaller. As a result, it is possible to achieve more accurate adjustment. With the operation ratio which is determined in such a manner, the control circuit 40 (adjustment control means) performs at least one of the focal position adjustment performed by the focus optical system 2 or the focal position adjustment performed by the master optical system 10 (step 74). Through the focal position adjustment, a subject is accurately brought into focus on the light receiving surface of the imaging element 11.

Further, only adjustment of the focal position based on movement of the focus optical system 2 may be performed if the zoom ratio is at a telephoto end, or only adjustment of the focal position based on movement of the master optical system 10 is performed if the zoom ratio is at a wide-angle end.

Figure 12:
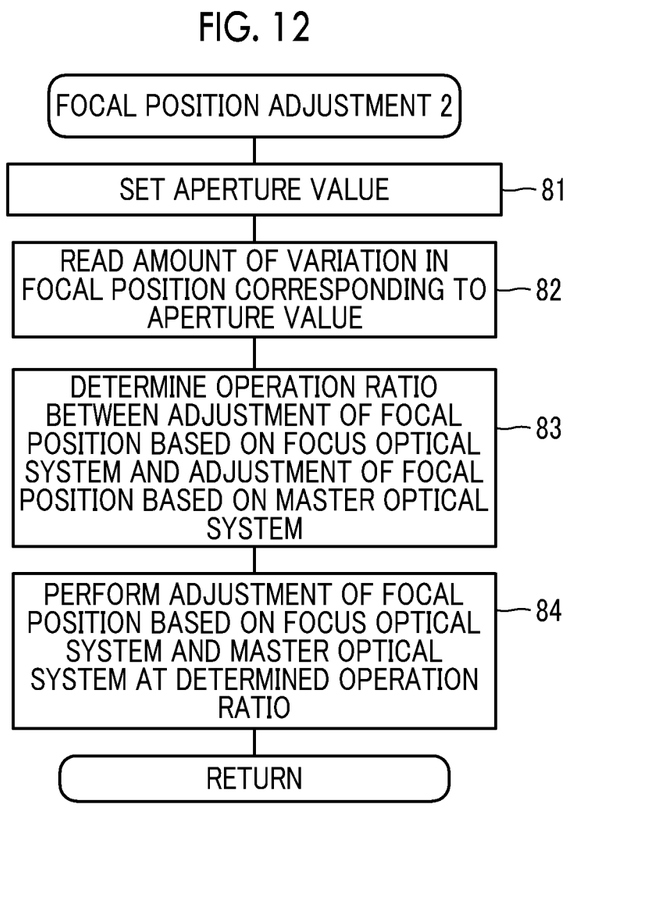
FIG. 12 is a flowchart illustrating a procedure of processing of adjusting the focal position.

FIG. 12 is a flowchart illustrating a procedure of processing of adjusting the focal position on the basis of the table shown in FIG. 8.

The diaphragm 6 is set at a desired aperture value of a user (step 81). The amount of variation in focal position corresponding to the set aperture value is read from the table shown in FIG. 8 (step 82). From the read amount of variation, an operation ratio between the focal position adjustment performed by the focus optical system 2 and the focal position adjustment performed by the master optical system 10 is determined (step 83). For example, the amount of adjustment of the focus optical system 2 is larger if a size of the opening of the diaphragm 6 is closer to a minimum thereof, and thus the amount of adjustment of the master optical system 10 is smaller. The amount of adjustment of the focus optical system 2 is smaller if the size of the opening of the diaphragm 6 is closer to a maximum (a fully opened size) thereof, and thus the amount of adjustment of the master optical system 10 is larger. The amount of variation in focal position is larger if the size of the opening of the diaphragm 6 is closer to the minimum thereof, and thus a percentage of the adjustment of the position adjusted by the focus optical system 2 in a larger movement unit is larger. As a result, it is possible to achieve faster adjustment. Further, the amount of variation in focal position is smaller if the size of the opening of the diaphragm 6 is closer to the maximum thereof, and thus the percentage of the adjustment of the position adjusted by the master optical system 10 in a smaller movement unit is smaller. As a result, it is possible to achieve more accurate adjustment. With the operation ratio which is determined in such a manner, the control circuit 40 (adjustment control means) performs at least one of the focal position adjustment performed by the focus optical system 2 or the focal position adjustment performed by the master optical system 10 (step 84).

In a case of an aperture value at which the opening of the diaphragm 6 is minimized, only the adjustment of the focal position based on the movement of the focus optical system 2 may be performed. In a case of an aperture value at which the opening of the diaphragm 6 is maximized, only the adjustment of the focal position based on the movement of the master optical system 10 may be performed.

Figure 13:
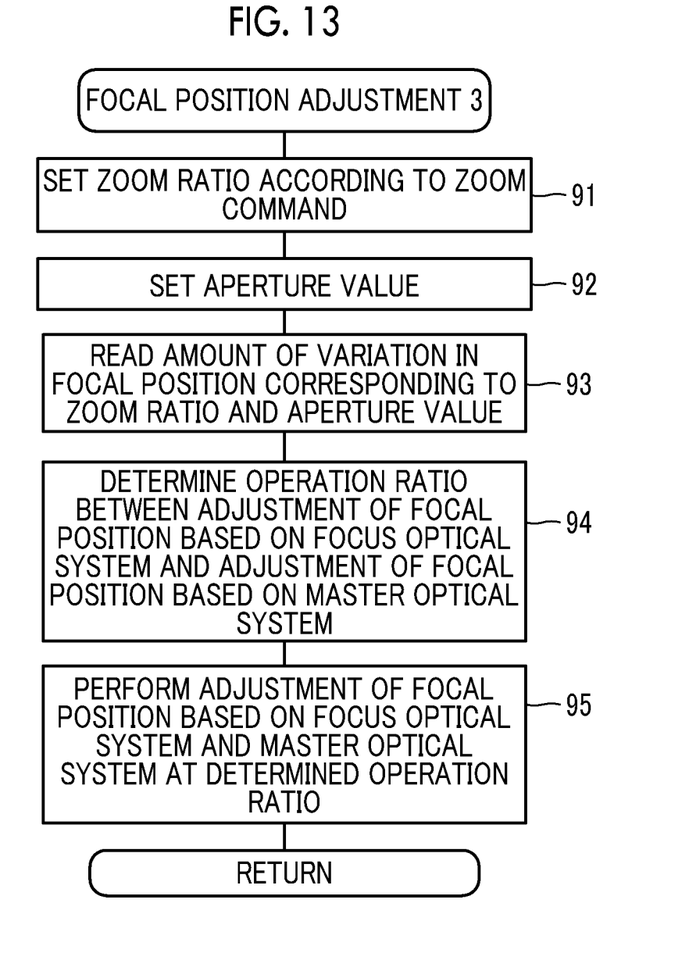
FIG. 13 is a flowchart illustrating a procedure of processing of adjusting the focal position.

FIG. 13 is a flowchart illustrating a procedure of processing of adjusting the focal position on the basis of the table shown in FIG. 9.

As described above, the zoom optical system 5 is set at a zoom ratio according to the zoom command (step 91), and an aperture value, which is desired by a user, is set (step 92). The amount of variation in focal position corresponding to the set zoom ratio and the set aperture value is read from the table shown in FIG. 9 (step 93). From the read amount of variation, the operation ratio between the focal position adjustment performed by the focus optical system 2 and the focal position adjustment performed by the master optical system 10 is determined (step 94). In this determination method, in a manner similar to that of the above description, the operation ratio between the focus optical system 2 and the master optical system 10 is determined as follows. At a position closer to the telephoto end, the amount of adjustment of the focus optical system 2 is larger, and the amount of adjustment of the master optical system 10 is smaller. At a position closer to the wide-angle end, the amount of adjustment of the focus optical system 2 is smaller, and the amount of adjustment of the master optical system 10 is larger. Further, if the size of the opening of the diaphragm 6 is closer to the minimum thereof, the amount of adjustment of the focus optical system 2 is larger, and the amount of adjustment of the master optical system 10 is smaller. If the size of the opening of the diaphragm 6 is closer to the maximum (a fully opened size) thereof, the amount of adjustment of the focus optical system 2 is smaller.

In this case, if the zoom ratio is at the telephoto end, only the adjustment of the focal position based on the movement of the focus optical system 2 may be performed regardless of the aperture value, and if the zoom ratio is at the telephoto end, only the adjustment of the focal position based on the movement of the focus optical system 2 may be performed in a case where the size of the opening of the diaphragm 6 is at the minimum. Further, in the case where the size of the opening of the diaphragm 6 is at the minimum, only the adjustment of the focal position based on the movement of the focus optical system 2 may be performed regardless of the zoom ratio. Likewise, if the zoom ratio is at the wide-angle end, only the adjustment of the focal position based on the movement of the master optical system 10 may be performed regardless of the aperture value, and if the zoom ratio is at the wide-angle end, only the adjustment of the focal position based on the movement of the master optical system 10 may be performed in a case where the size of the opening of the diaphragm 6 is at the maximum. Further, in the case where the size of the opening of the diaphragm 6 is at the maximum, only the adjustment of the focal position based on the movement of the master optical system 10 may be performed regardless of the zoom ratio. With the operation ratio which is determined in such a manner, the control circuit 40 (adjustment control means) performs at least one of the focal position adjustment performed by the focus optical system 2 or the focal position adjustment performed by the master optical system 10 (step 95).

In a case of capturing an image of a subject which is moving, focusing is performed by the focus optical system 2 while a zooming operation is performed by the zoom optical system 5. In a case where the movement of the subject is slow, the focus optical system 2 is controlled such that the amount of variation in focal position is added to (subtracted from) the focal position of the focus optical system 2 obtained without consideration of the amount of variation in focal position. It is possible to accurately bring a subject into focus. In a case where the movement of the subject is fast, the focus optical system 2 is controlled to be at the focal position of the focus optical system 2 obtained without consideration of the amount of variation in focal position. Thereby, it is possible to promptly bring the subject into focus. Thereafter, the focus optical system 2 is controlled to be at the focal position to which the amount of variation in focal position is added.

In the above-mentioned example, the adjustment is performed using the focus optical system 2 and the master optical system 10 so as to obtain a focal position by adding (subtracting) the amount of variation in focal position to (from) the focal position as a reference which is obtained without consideration of the amount of variation in focal position. However, if the focal position to (from) which the amount of variation in focal position was added (subtracted) is set as a reference, the focal position to (from) which the amount of variation in focal position was added (subtracted) may be used. For example, referring to FIG. 7, in a case where the zoom ratio is set as Z2, the amount of variation in focal position is V2. Therefore, the focus optical system 2 and the master optical system 10 are controlled such that the focal position is adjusted by the amount of variation V2 from the focal position calculated in a case where the amount of variation in focal position is not considered. However, in a case where the zoom ratio is changed from Z2 to Z3, the focal position may be adjusted by an amount of V3−V2 which is a difference between the amounts of variation in focal position. Therefore, the amount of adjustment may be small. In such a case, only the master optical system 10 may be used. It is possible to accurately perform fine adjustment.

By performing a routine such as a correction mode for measuring the focal position for each zoom ratio or each aperture value, it is possible to check a current amount of variation. By comparing the current amount of variation with the amount of variation (the amount of variation of the initial value) stored in advance, it is possible to diagnose a current driving state of the television camera lens 1. In a system in which an amount of correction in reciprocation is stored, hysteresis characteristics between the focus optical system 2 and the master optical system 10 are compared. Therefore, it is possible to quantitatively capture the amount of backlash by the cam. Further, in a case where the difference between the current amount of variation and the amount of variation of the initial value is greater than a threshold value, it is determined that failure occurs. For example, this configuration can also be applied to determination as to whether the television camera lens 1 fails.

What is claimed is:

1. A lens device comprising:
   a plurality of lenses that an optical axis is common;
   a lens moving mechanism that moves one or more lenses, which are included in the plurality of lenses, in a direction of an optical axis of the plurality of lenses;
   a storage section that stores a plurality of positions of the plurality of lenses in the direction of the optical axis and a plurality of rotation angles respectively corresponding to the plurality of positions; and
   a lens rotating mechanism that rotates at least one lens, which are included in the plurality of lenses, about the optical axis of the lens by a rotation angle corresponding to a position of the lens, which is moved by the lens moving mechanism, in the direction of the optical axis, among the plurality of rotation angles stored in the storage section, and that is driven separately from the lens moving mechanism.

2. The lens device according to claim 1, wherein the at least one lens, which is rotated by the lens rotating mechanism, is a lens, of which at least one of a surface shape or a refractive index is relatively uneven in a circumferential direction orthogonal to the optical axis and centered on the optical axis, among the plurality of lenses.

3. The lens device according to claim 1, wherein the at least one lens, which is rotated by the lens rotating mechanism, is a lens, of which an optical sensitivity is relatively low, among the plurality of lenses.

4. The lens device according to claim 1,
   wherein the lens device includes a zoom optical system, and
   wherein the lens, which is moved by the lens moving mechanism, is a lens included in the zoom optical system.

5. The lens device according to claim 1,
   wherein the plurality of lenses includes a focus optical system that is moved by a first movement unit so as to thereby adjust a focal position, a master optical system that is moved by a second movement unit, which is smaller than a movement unit of the focus optical system, so as to thereby adjust the focal position, and a zoom optical system that changes a zoom ratio, and
   wherein the lens device further comprises: a diaphragm that restricts an amount of incident light; and adjustment control device for performing at least one of adjustment of the focal position performed by the focus optical system or adjustment of the focal position performed by the master optical system, on the basis of an amount of variation in focal position which is predetermined to correspond to the zoom ratio of the zoom optical system or an aperture value of the diaphragm.

6. The lens device according to claim 5, further comprising a memory that stores an amount of adjustment of the focal position.

7. The lens device according to claim 5, wherein as adjustment of the focal position performed by the adjustment control device, only adjustment of the focal position based on movement of the focus optical system is performed if the zoom ratio is at a telephoto end, or only adjustment of the focal position based on movement of the master optical system is performed if the zoom ratio is at a wide-angle end.

8. The lens device according to claim 5, wherein in accordance with the amount of variation in focal position, the amount of adjustment of the focal position based on the movement of the focus optical system is larger at a position closer to the telephoto end and is smaller at a position closer to the wide-angle end, and the amount of adjustment of the focal position based on the movement of the master optical system is larger at a position closer to the wide-angle end and is smaller at a position closer to the telephoto end.

9. The lens device according to claim 5, wherein in accordance with the amount of variation in focal position, in a case of an aperture value at which an opening of the diaphragm is minimized, only the adjustment of the focal position based on the movement of the focus optical system is performed, and in a case of an aperture value at which the opening of the diaphragm is maximized, only the adjustment of the focal position based on the movement of the master optical system is performed.

10. The lens device according to claim 5, wherein in accordance with the amount of variation in focal position, the amount of adjustment of the focal position based on the movement of the focus optical system is larger at an aperture value closer to an aperture value at which the opening of the diaphragm is minimized, and is smaller at an aperture value closer to an aperture value at which the opening of the diaphragm is maximized, and the amount of adjustment of the focal position based on the movement of the master optical system is larger if a size of the opening of the diaphragm is closer to a maximum thereof and is smaller if the size of the opening of the diaphragm is closer to a minimum thereof.

11. A correction method for a lens device having a plurality of lenses that an optical axis is common, the method comprising:
   causing a lens moving mechanism to move one or more lenses, which are included in the plurality of lenses, in a direction of an optical axis of the plurality of lenses;
   causing a storage section to store a plurality of positions of the plurality of lenses in the direction of the optical axis and a plurality of rotation angles respectively corresponding to the plurality of positions; and
   causing a lens rotating mechanism, which can be driven separately from the lens moving mechanism, to rotate at least one lens, which are included in the plurality of lenses, about the optical axis of the lens by a rotation angle corresponding to a position of the lens, which is moved by the lens moving mechanism, in the direction of the optical axis, among the plurality of rotation angles stored in the storage section.

* * * * *